No. 680,203. Patented Aug. 6, 1901.
C. C. HENDERSON.
MAGAZINE CAMERA.
(Application filed Sept. 5, 1900.)

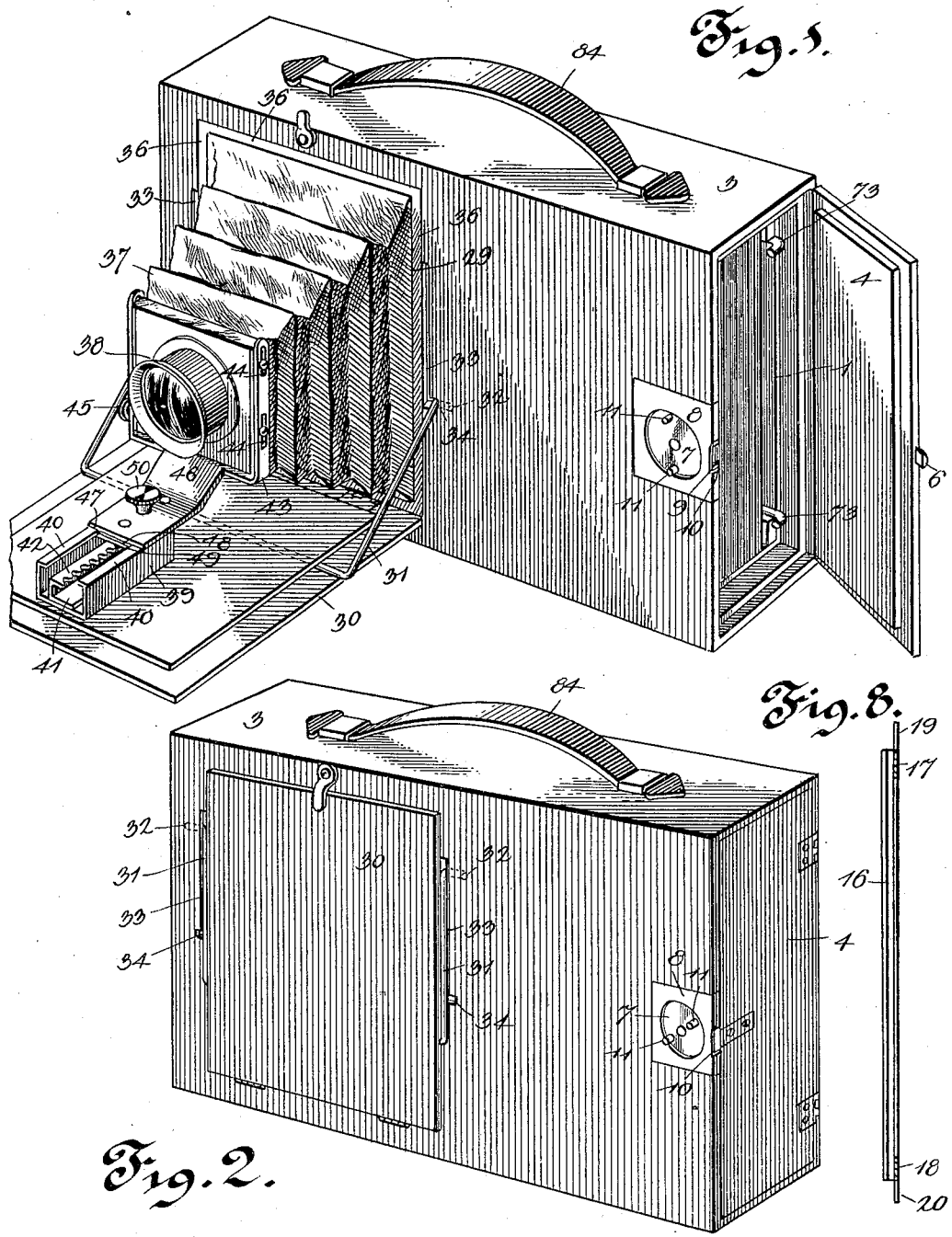

(No Model.) 3 Sheets—Sheet 2.

Witnesses Charles C. Henderson, Inventor.
Frank Culverwell.
Chas. S. Hyer. By C.A. Snow & Co.
Attorneys No. 680,203. Patented Aug. 6, 1901.
C. C. HENDERSON.
MAGAZINE CAMERA.
(Application filed Sept. 5, 1900.)
(No Model.) 3 Sheets—Sheet 3.
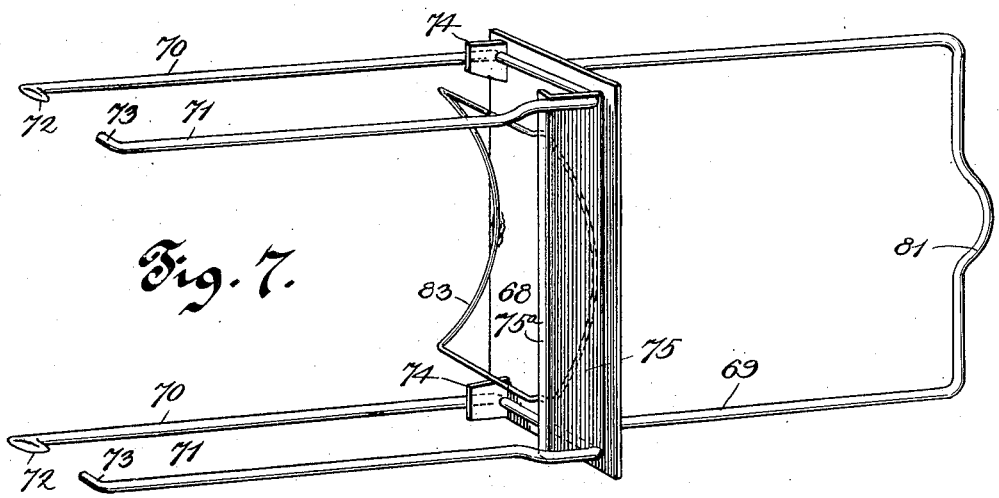
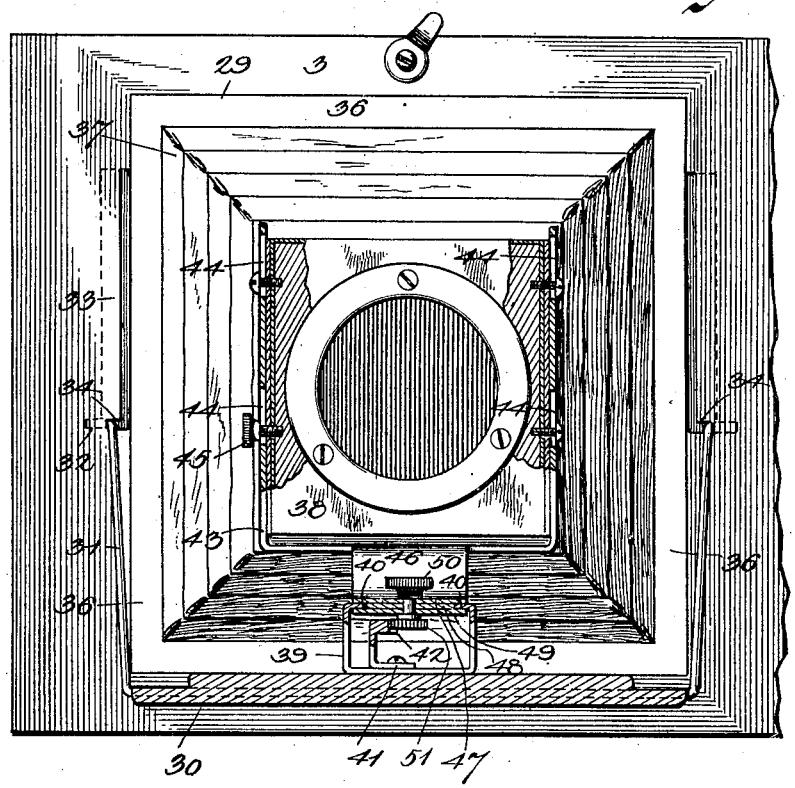

UNITED STATES PATENT OFFICE.

CHARLES CALVIN HENDERSON, OF SPRINGVALLEY, MINNESOTA, ASSIGNOR TO CONLEY CAMERA COMPANY, OF SAME PLACE.

MAGAZINE-CAMERA.

SPECIFICATION forming part of Letters Patent No. 680,203, dated August 6, 1901.

Application filed September 5, 1900. Serial No. 29,074. (No model.)

*To all whom it may concern:*

Be it known that I, CHARLES CALVIN HENDERSON, a citizen of the United States, residing at Springvalley, in the county of Fillmore and State of Minnesota, have invented a new and useful Magazine-Camera, of which the following is a specification.

This invention relates to a focusing magazine-camera; and the primary object is to provide a simple and effective camera structure wherein a plurality of sensitized plates or films may be inserted and individually drawn into a focusing-chamber from a containing or receiving chamber and be mechanically disposed in accurate position for exposure and successively change and store the exposed plates or films and replace them with unused plates or films and also to have an automatically-operating focusing means and means for excluding light from the camera structure as an entirety, but particularly from the containing or receiving chamber, plate or film disposing instrumentalities and holding means being conjointly arranged within both chambers and operating at the time of movement of the plates or films to automatically obtain the alinement and stack relation of the used and unused plates or films, the whole being compact in construction, strong and durable, and easily and readily operated.

The invention consists in the construction and arrangement of the several parts in subcombination and in detail, as well as in certain contributory organization to produce a unitary result, and wherein only a limited number of parts will be included, which will be more fully hereinafter described and claimed and subject to a wide range of modification in form, size, proportions, and minor details, and obvious equivalents fully within the scope of the invention.

Figure 3:
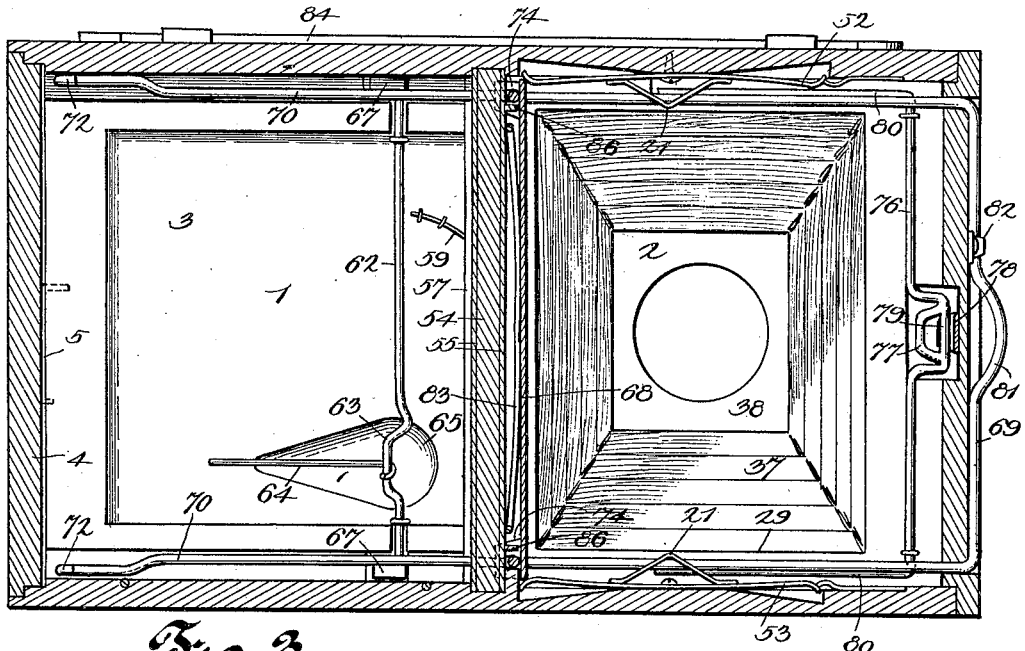
Figure 4:
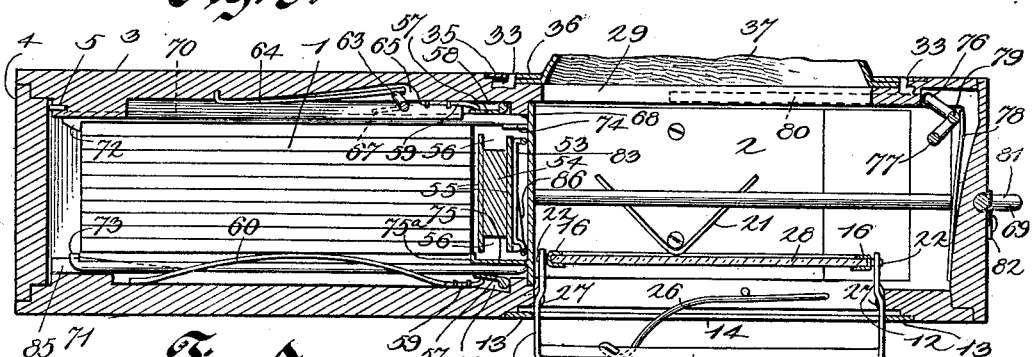
Figure 5:
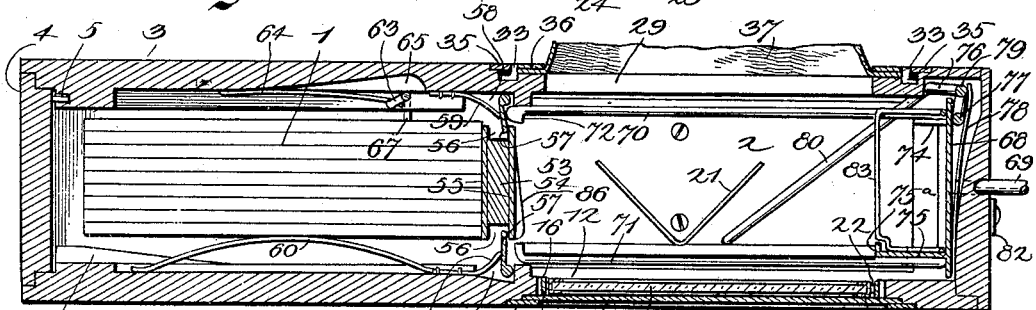

In the drawings, Figure 1 is a perspective view of the camera embodying the features of the invention and showing the plate or film receiving chamber open and the bellows and lens partially extended for use. Fig. 2 is a similar view of the camera shown completely closed. Fig. 3 is a longitudinal vertical section of the improved camera, taken through the receiving and focusing chambers and looking thereinto from the rear. Fig. 4 is a horizontal section through the receiving and focusing chambers, showing the focusing means in operative position and as it appears before the plate or film is disposed in front thereof. Fig. 5 is a view similar to Fig. 4, showing the plate or film in operative position in front of the focusing means and the position of the parts as designed for returning the plate or film after exposure into the rear of the receiving-chamber. Fig. 6 is a sectional elevation of the bellows end of the camera looking from the front. Fig. 7 is a detail perspective view of the plate or film carrier or shifter. Fig. 8 is a transverse vertical section through the object-glass holder.

Similar numerals of reference are employed to indicate corresponding parts in the several views.

The numerals 1 and 2, respectively, designate a receiving or containing chamber and a focusing-chamber, which are inclosed by a rectangular frame 3, of suitable material and of dimensions corresponding to that of the said chambers. The outer end of the receiving or containing chamber is provided with a hinged side-opening door 4, arranged to form a light-tight joint with the said end when closed, and bears at its free end when closed against a wire spring 5, which automatically throws the door part-way open when the locking means therefor is released, so as to avoid any inconvenience in gaining access to the chamber 1 to supply the same with a charge or load of plates or films or to remove the latter therefrom after exposure of the contained series. The free side edge of the door 4 has a projecting striker 6 to engage a lock on the front of the frame close to the said outer end of the chamber 1, the said lock comprising a rotatable flanged plate or disk 7 let into the frame and covered by an open retaining-plate 8, the flange of the plate or disk 7 being slotted at one point, as at 9, to aline with a corresponding slot 10 in the outer bent edge of the plate 8 to let the striker 6 pass inwardly beyond the plane of rotation of the disk. After the striker is pressed into the slots of the flange of the plate 8 and the flange of the plate or disk 9 the latter device is rotated to bring the flange thereof over the striker by means of two diametrically opposed outstanding studs or pins 11. This form of lock effects an exceptionally light-tight joint between the chamber end and the door and one wherein wear can be compensated for by changing the portion of the flange of the plate or disk 7 bearing on the striker by rotation of the said plate or disk. The rear portion of the focusing-chamber 2 is formed with an opening 12, and around the same at the back of the frame are side guides 13 and a bottom-retaining strip 14 to receive a vertically-removable closing-slide 15. Within the said opening 12, close to the rear of the frame, a focusing means or ground-glass holder is movably mounted for automatic operation and consists of side guides 16, connected at the top and bottom by cross-bars 17 and 18, the bar 17 having an upwardly-projecting elongated stop 19 at the center and the bar 18 a similarly-located downwardly-projecting elongated stop 20, both stops contacting with rearwardly-projecting substantially V-shaped springs 21, secured to the bottom and top portions of the focusing-chamber and preferably formed of light spring-wire. These springs limit the forward movement of the holder and dispose the glass thereof in accurate focal range relatively to the lens of the camera, which will be more fully hereinafter described. The holder has central trunnion-pins 22 projecting outwardly from the guides 16, which are pivotally mounted in the upper ends of the side arms 23 of a bail 24, having a lower cross-bar 25 connecting the said arms and engaged by a rearwardly-impelling spring 26, fastened to the bottom of the rear portion of the chamber 2 and operating to throw the said bar 25 rearward beyond the plane of the back of the frame and the said arms forwardly at their upper ends, the arms being intermediately fulcrumed by removable screws 27. The focusing means or ground glass 28 can be easily removed from the holder for replacement by another in the event of breakage or for any other purpose, and it will be seen that as soon as the slide 15 is withdrawn the spring 26 will throw the bail 24 rearwardly at the lower end of the same and the object-glass and its holder forwardly in view of the pivotal relation of the latter to the arms 23, and the said glass and holder will be disposed in a vertical plane by the stop on the upper cross-bar first striking the upper spring 21 and the lower cross-bar by said initial contact caused to move forwardly and engage the lower spring 21. The cross-bars 17 and 18 of the holder have a yielding movement sufficient to avoid an abrupt or jarring contact of the same with the springs and will consequently neutralize the said parts relatively to a rebounding action and avoid the latter and also obviate any necessity for extraneous manipulation of the focusing means or ground-glass holder in order to adjust the same in operative position. When the slide 15 is shoved or pushed back into place, the holder and glass will be thrown to the rear closely thereagainst in view of forward movement of the lower portion of the bail to give place to the slide and the rearwardly-drawing action of the arms 23 on the guides of the holder. This clearing of the rear portion of the focusing-chamber is imperative in view of the magazine operation, which will be more fully hereinafter set forth; but by the arrangement of parts and operation set forth the advantages of a self-positioning object-glass is acquired in a magazine-camera without rendering the latter complex or intricate. The front of the focusing-chamber is also formed with an opening 29, which is closed by a drop-door 30, having slide-hangers 31 pivotally connected to the opposite side portions thereof and also having outturned angular ends 32, movable in guide-grooves 33, vertically disposed in the front of the frame, and having lower terminal recesses or seats 34 projecting outwardly therefrom to receive the ends 32 of the hangers to lock the drop-door 30 against accidental closing movement. By slightly drawing the hangers inwardly toward each other the ends 32 thereof can be easily disengaged from the seats 34 and slid upwardly through the grooves 33 and permit the door 30 to be closed against the front of the frame. At the outer portions of the grooves 33 are metal wear-strips 35, and completely surrounding the opening 29 are metal binding-strips 36, which secure the inner enlarged portion of a bellows 37 around the said opening. The said bellows is foldable into the opening 29, and its outer reduced portion has a lens-frame 38, secured thereto and vertically disposed, the said frame being adapted to have a shutter attachment and other appurtenances or appliances used therewith. On the door 30 a track 39 is fixed and consists of a rectangular body of partial tubular form having inturned side edges 40, and within the confines of the body is an angle-plate 41, with an inwardly-extending edge having rack-teeth 42. Embracing the lens-frame 38 is a U-shaped adjusting-yoke 43, having slots 44 in the side bars to slidingly engage headed studs on the frame, and with the side bars a set-screw 45 has operative relation to fix the adjustment of the yoke and of the lens-frame and lens, as may be desired and found necessary, and thus vary the vertical position of the lens relatively to the object-glass and the plate or film at the rear of the focusing-chamber. Extending forwardly and downwardly from the bottom bar of the yoke 43 is a slide-arm 46, having side edge grooves 47, provided by the application of plates 48 and 49 of different widths to the bottom thereof. The inturned side edges 40 of the track engage the grooves 47, and the arm 46 has sliding bearing on the track to adjust the bellows, the desired projection of the bellows being maintained by a headed turn-stud 50, vertically disposed in the center of the arm 46 and having a pinion 51 fixed on the lower end thereof, which meshes with the rack-teeth 42. By this means the lens-frame and lens will be steadied and provided with a very sensitive adjuster with obvious advantages. When the door 30 is opened and the camera arranged for use, the arm 46 is caused to engage the track from the inner extremity of the latter and the pinion 51 is brought into mesh with the teeth 42, and the door being held rigid by the hangers, as heretofore set forth, a firm support for the bellows is provided. When it is desired to close the camera, the arm 46 is disconnected from the track and the bellows pushed back into the chamber 2, together with the said arm, and the door 30 can then be closed and fastened by a suitable catch, as shown.

At the top and bottom of the chamber 2 are broad metal springs constructed of thin sheet metal, the upper spring 52 having a downwardly-projecting portion and the lower spring 53 a reversely-projecting part, so that the plate or film holders or the said devices themselves will be held by a yielding pressure from above and below to maintain them in proper position for exposure and at the same time permit them to be shifted without sticking. As clearly shown by Figs. 3, 4, and 5, a vertical partition 54 is secured in the frame between the chambers 1 and 2, the said partition extending transversely, with a space between the front and rear edges thereof and the front and rear of the frame adjacent thereto. The partition is composed mainly of an intermediate body of suitable material, having plates 55 thereon with front and rear projecting edges to form channels 56 to receive the ends of automatically-closing shutters 57, pivotally mounted in recesses 58 in the front and rear portions of the frame, and when closed into the channels completely exclude the light from the receiving or containing chamber 1. The said shutters are automatically closed by springs 59, and by having the said shutters open into recesses it will be seen that they will fully clear the passages between the front and rear side edges of the partition and the adjacent portions of the frame. The plates or films and the holders therefor are pushed toward the front by upper and lower bowed springs 60, of flat metal and located in the back of the containing or receiving chamber. In the front wall of the receiving or containing chamber is a plate or film placer 61, consisting of a vertically-disposed shaft 62, which is near the partition and formed with a lower crank 63, having a spring 64 attached thereto which works in a recess 65 and operates to throw the crank rearwardly into the chamber. This placer comes into place or acts to keep the plates or films at the front in position in relation to each other when the portion of the plate or film carrier or shifter which is normally within the receiving or containing chamber is withdrawn from the latter. To assist in the forward movement of the plates or films and their holders and cause them to slip without obstruction or friction, the lower edges bear on two transversely-extending rods 66 in the bottom of the frame and project high enough above the plane of the said bottom to prevent the lower edges of the plates or films and their holders from contacting with any surface except the projecting portions of the rods. The upper and lower ends of the shaft 62 have metal plates 67 secured thereto and arranged at such an angle that when portions of the carrier or shifter strike thereagainst the crank 63 is thrown out against the front wall of the chamber 1. By thus throwing the crank 63 out of the way injury to the plates or films is prevented and the latter are also entirely cleared for shifting from the front of the stack into the focusing-chamber.

The plate carrier or shifter is shown in detail in Fig. 7 and comprises an intermediate closing-plate 68 to bear against the partition 54 and completely darken the receiving or containing chamber when the shutters 57 are open at the time the carrier is in normal position or when the focusing-chamber is cleared. A pull-yoke 69 is connected to the plate 68 and works through the end wall of the focusing-chamber, as shown in Figs. 3, 4, and 5, and to the front of the plate or that side adjacent the partition are pairs of arms 70 and 71, which move through the spaces between the front and rear ends or edges of the partition and the front and back of the frame. These arms are located near the upper and lower ends of the plate 68 and are vertically alined, the front arm 70 and rear arm 71 of each pair being continuous for convenience in construction, as shown, and the front arms having terminal hooks 72 to draw the plates individually into the focusing-chamber for exposure. The hooks have an extent just about equal to or slightly less than the plates or films and the holders thereof, so that only one of the same will be engaged at a single operation of the carrier or shifter. The terminals of the arms 71 are formed as forwardly-projecting right-angular holders 73 to return the exposed plate or film and its holder back into the receiving or containing chamber in rear of the stack or load of plates or films therein, and thereby always push the unexposed plates or films to the front. Secured to the arms 70 at their points of emanation from the plate 68 are small striker-plates 74, and connected to the similar portions of the rear arms 71 and to the said plate 68 is an auxiliary closing-strip 75 at a right angle to the latter and movable into the rear space between the partition and the frame at the rear to particularly operate to place the exposed plates in proper position in the chamber 1, the free edge 75$^a$ of the strip 75 being bent at a right angle in a forward direction and, with the holders 73, providing a seat of a dimension equal to and adapted to receive the plates or films. The arms 71 are so positioned as not to interfere with the action of the springs 60, which push the returned plate or film forward and clear it from the seat provided, as set forth, so that there will be no obstruction to the subsequent operation of the arms 71 in drawing another unused plate or film from the front of the stack or load into the focusing-chamber for exposure.

In the front portion of the focusing-chamber 2 a plate or film positioning device is located, and comprises a vertically-disposed rock-shaft 76, situated close to the outer end wall of the said chamber and formed or provided with a centrally-located angular crank 77, which normally projects into the chamber and is so held by a flat spring 78, bearing against a rod 79 at a distance from the engaging end of the crank, so as to leave the latter clear. The upper and lower ends of the said shaft have crank-arms 80, which move from the front to the rear of the focusing-chamber in a diagonal direction and are of such length as to accurately dispose each plate or film for exposure. The said plate or film positioning device is mounted in suitable recesses in order to allow a flush fitting of the parts thereof with the walls of the chamber 2 and obviate obstructions to the easy movement of the carrier or shifter. In the center of the pull-yoke 69 and exterior of the outer end of the focusing-chamber is an outward loop 81 for convenience in grasping the same, and on the said end of the chamber is a suitable turn-catch 82 for locking the pull-yoke and the carrier or shifter against movement. The inner side of the plate 68 is also provided with a cushioning-spring 83, which stands outward therefrom adjacent the upper and lower portions to strike against the outer side of the partition between the chambers (see Figs. 3 and 4) and to form a guide for the plates in moving to the rear in chamber 2. The top of the frame is also provided with a carrying-grip 84, and it will be seen that the entire camera when closed will occupy but a small amount of space and will be exceptionally compact.

In the operation of the plate or film carrier or shifter the arms 70 draw the outermost unused plate or film into the focusing-chamber, and the positioning device is not actuated until the plate or film has been entirely drawn from the chamber 1, and at this time the outer front portion of the plate 68 will strike the crank 77 and press the latter outward against the end wall of the chamber 2. This operation of the crank will rotate the shaft 76 against the resistance of the spring 78 and throw the arms 80 rearwardly and press the plate or film in proper focal range toward the rear and into the seat formed between the angular edge 75ª of the strip 75 and the holders 73 of the arms 71, as clearly shown by Fig. 5. After the plate or film has been exposed and received the object the pull-yoke of the carrier or shifter is shoved inwardly, and the small striker-plates 74 contact with the arms 80 and move the latter to the front, and thereby give the plate 68 free sliding movement. The said striker-plates act as a positive means for moving the arms 80 out of the way, though it will be understood that the spring 78 when relieved of pressure will also have a tendency to return the said arms to normal position as well as cushion the movement of the entire positioning device. As the plate or film that has been exposed arrives behind the stack or load of similar devices in the chamber 1 the springs 60 immediately disengage the same, and the camera is then ready for a similar subsequent operation.

The number of plates or films in the chamber 1 may be varied in accordance with the dimensions of the camera, and at all points a light-tight structure will be produced to prevent injury to the plates or films before and after exposure, the means employed for such purpose, in addition to those described, being any of the well-known packings applied over the crevices or inserted in the latter at the joints. The entire frame may also be suitably covered and ornamented.

To assist in relieving the plates or films from the seat therefor in the rear part of the carrier or shifter, the rear portion of the receiving-chamber at upper and lower parts thereof is provided with dischargers 85, consisting of inclined strips over which the rear portion of the said carrier or shifter moves, the plate or film in the seat of the said carrier being moved forward therefrom by the inclination of the inner portions of the said strips. On the outer side of the partition, between the chambers, upper and lower inclined guides 86 are secured and have their greatest projection at the rear. The object of these guides is to insure the placement of the plates or films when pushed rearward in the focusing and exposing chamber 2 in the seat of the carrier or shifter, and, as shown by Fig. 4, the rear terminals of said guides aline with the inner extent of the said seat when the carrier or shifter is fully drawn out. Thus it will be seen that the improved camera is fully equipped to meet and overcome all tendencies toward an inaccurate operation.

Having thus described the invention, what is claimed as new is—

1. In a magazine-camera, the combination of a casing having a magazine-chamber and an exposing-chamber with a passage-way connecting the same, a sensitized-surface carrier movable through said passage-way into both of said chambers, means for automatically closing said passage-way, and a bellows located in front of and foldable into the said exposure-chamber and arranged to support a lens.

2. In a magazine-camera, the combination of a casing having a magazine-chamber and an exposing-chamber with a passage-way connecting the same, a sensitized-surface carrier movable through said passage-way into both of said chambers, means for shifting said carrier from one chamber to the other, lens devices in front of the exposing-chamber, and automatically-operating focusing means in the rear portion of the exposing-chamber.

3. A magazine-camera comprising a casing having a magazine-chamber and an exposing-chamber with a passage-way connecting the same, means for moving sensitized surfaces from one chamber to the other, an automatically-operating focusing means in the rear portion of the exposing-chamber, lens devices applied to the front part of the latter chamber, and means for automatically disposing the several sensitized surfaces in proper focal range and actuated by the means for moving said surfaces.

4. A magazine-camera comprising a casing having two alined chambers, the one chamber for storing and the other chamber for exposing sensitized surfaces, and automatically-operating means in the rear portion of the exposing-chamber approximately of the same size as and for holding and vertically disposing said surfaces in proper focal range after they have been moved from the storing-chamber for the same.

5. A magazine-camera comprising a casing having a magazine-chamber and an exposing-chamber respectively for the storage and exposure of sensitized surfaces, an automatically forwardly movable ground glass in the rear portion of the exposing-chamber, and a bellows in front of and foldable into the exposing-chamber and carrying lens devices.

6. A magazine-camera having two communicating chambers, the one for receiving a charge of and the other for individually exposing sensitized surfaces, and an automatically-movable focusing means in the form of a ground glass in the exposing-chamber.

7. A magazine-camera having a magazine-chamber and an exposing-chamber for respectively receiving a charge of and individually exposing sensitized surfaces, and an automatically-operating forwardly-movable device for focusing purposes within the exposing-chamber, said movable device being fully retracted to the rear of the exposing-chamber while exposing and shifting the said surfaces.

8. A magazine-camera comprising two communicating chambers for respectively receiving a charge of and individually exposing sensitized surfaces, and an automatically forwardly movable device within the exposing-chamber adapted to have the sensitized surfaces individually drawn in front of the same for focusing purposes, said movable device being fully retracted to the rear of the exposing-chamber while exposing and shifting the said surfaces.

9. A magazine-camera comprising a casing having a magazine-chamber and an exposing-chamber, a partition for separating the chambers having spaces between the front and rear edges thereof and the front and rear walls of the casing, automatically-operating shutters for closing said spaces, and a carrier for moving sensitized surfaces from one chamber to the other through the said spaces.

10. A magazine-camera comprising a casing having a magazine-chamber and an exposing-chamber communicating with the latter, upper and lower flat springs in the exposing-chamber having projecting portions, flat springs in the rear portion of the magazine-chamber, an automatically-operating placer in the front portion of the magazine-chamber, and a carrier for shifting sensitized surfaces from one chamber to the other in alternation.

11. A magazine-camera comprising a casing having a magazine-chamber and an exposing-chamber in communication with each other, upper and lower flat springs with projections located in the exposing-chamber, flat springs in the rear portion of the magazine-chamber, an automatically-operating placer in the front portion of the magazine-chamber, rearwardly-directed substantially V-shaped springs in the upper and lower portions of the exposing-chamber, and a carrier for shifting sensitized surfaces from one chamber into the other in alternation.

12. A magazine-camera comprising a magazine-chamber and an exposing-chamber in communication with each other, upper and lower substantially V-shaped springs in the exposing-chamber having a rearward direction, and a carrier for shifting sensitized surfaces from one chamber into the other in alternation.

13. A magazine-camera comprising a magazine-chamber and an exposing-chamber in communication with each other, the magazine-chamber having upper and lower inclined dischargers at the rear thereof, and a carrier for shifting sensitized surfaces from one chamber into the other in alternation provided with a rear seat for said surfaces and movable in relation to said dischargers.

14. A magazine-camera comprising a magazine-chamber and an exposing-chamber in communication with each other, a carrier for shifting sensitized surfaces from one chamber into the other in alternation, said carrier having a rear seat for said surfaces, and an automatically-operating disposing device for said surfaces in the exposing-chamber for arranging the said surfaces in the seat of the carrier.

15. A camera comprising a magazine-chamber and an exposing-chamber in communication with each other, and a carrier for shifting sensitized surfaces from one chamber into the other and provided with a front pair of arms with hooked terminals and a rear pair of arms forming a seat for said surfaces.

16. A magazine-camera comprising a magazine-chamber and an exposing-chamber in communication with each other, means for shifting sensitized surfaces from one chamber into the other, a drop-door in front of the exposing-chamber, and a bellows foldable into the latter chamber and adapted to be adjustably connected to the drop-door, the said bellows having lens devices.

17. A magazine-camera comprising a casing having a magazine-chamber and an exposing-chamber in communication with each other, means for shifting sensitized surfaces from one chamber into the other, a drop-door in front of the exposing-chamber having slidable hangers attached thereto, and a bellows carrying lens devices foldable into the said exposing-chamber and adapted to be connected to the drop-door.

18. A magazine-camera comprising a casing having a magazine-chamber and an exposing-chamber in communication with each other, means for shifting sensitized surfaces from one chamber into the other, an automatically-operating focusing attachment in the rear of the exposing-chamber, foldable lens-carrying devices in front of the latter chamber, and a slide removably mounted in the rear portion of said exposing-chamber.

19. A magazine-camera comprising a magazine-chamber and an exposing-chamber, means for shifting sensitized surfaces from one chamber into the other, an automatically forwardly moving focusing means in the rear of the said exposing-chamber operating to properly focus said surfaces, and a slide for rearwardly closing over and retracting said focusing means.

In testimony that I claim the foregoing as my own I have hereto affixed my signature in the presence of two witnesses.

CHARLES CALVIN HENDERSON.

Witnesses:
HARRIS E. LEACH,
FAY B. VIALL.